United States Patent
Tsujino et al.

(10) Patent No.: US 10,994,723 B2
(45) Date of Patent: May 4, 2021

(54) PARKING CONTROL DEVICE, PARKING CONTROL METHOD, VEHICLE, AND COMPUTER READABLE NON-TRANSITORY RECORDING MEDIUM STORING A PROGRAM

(71) Applicant: HONDA MOTOR CO., LTD., Tokyo (JP)

(72) Inventors: Miki Tsujino, Wako (JP); Masashi Yoshifuku, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 16/561,517

(22) Filed: Sep. 5, 2019

(65) Prior Publication Data

US 2020/0079358 A1 Mar. 12, 2020

(30) Foreign Application Priority Data

Sep. 7, 2018 (JP) .............................. JP2018-167452

(51) Int. Cl.
*B60W 30/06* (2006.01)
*B62D 5/04* (2006.01)
(Continued)

(52) U.S. Cl.
CPC .............. *B60W 30/06* (2013.01); *B60T 7/12* (2013.01); *B62D 5/04* (2013.01); *B62D 15/0285* (2013.01); *G08G 1/14* (2013.01); *G08G 1/168* (2013.01)

(58) Field of Classification Search
CPC .... H01Q 1/3233; H01Q 1/1264; H01Q 1/364; H01Q 3/08; H01Q 19/18; G01S 7/032;
(Continued)

(56) References Cited

U.S. PATENT DOCUMENTS

2014/0222252 A1 8/2014 Matters et al.
2015/0197254 A1* 7/2015 Wysietzki ............. B60W 40/10
701/41
(Continued)

FOREIGN PATENT DOCUMENTS

JP 4893162 B2 3/2012
JP 2015-016803 A 1/2015

OTHER PUBLICATIONS

Office Action dated Mar. 24, 2020 issued over the corresponding Japanese Patent Application No. 2018-167452 with the English translation thereof.

*Primary Examiner* — Daryl C Pope
(74) *Attorney, Agent, or Firm* — Carrier Blackman & Associates, P.C.; Joseph P. Carrier; Jeffrey T. Gegeon

(57) ABSTRACT

A parking control device includes a detection unit configured to detect at least one possible parking position in which a vehicle is capable of being parked, and a control unit configured to, after a target parking position has been selected from among the possible parking positions, initiate movement of the vehicle into the target parking position on the basis of an operation over a prolonged time period having been performed by a user, the operation over the prolonged time period being an operation in which an operation input unit is continuously maintained in a predetermined state over a threshold time period or greater, the operation input unit being used at least when switching between forward movement and rearward movement of the vehicle.

12 Claims, 7 Drawing Sheets

(51) Int. Cl.
  *B62D 15/02* (2006.01)
  *G08G 1/14* (2006.01)
  *G08G 1/16* (2006.01)
  *B60T 7/12* (2006.01)

(58) Field of Classification Search
  CPC .... G01S 2007/4034; G01S 7/497; G01S 7/03; G01S 7/4817; G01S 7/4815; G01S 7/4026; G01S 13/931; G01S 7/02
  See application file for complete search history.

(56) References Cited

U.S. PATENT DOCUMENTS

| | | |
|---|---|---|
| 2016/0378104 A1 | 12/2016 | Hiei et al. |
| 2017/0282913 A1* | 10/2017 | Qian .................... B62D 15/027 |
| 2018/0012497 A1* | 1/2018 | Penilla ................ G05D 1/0011 |
| 2019/0094025 A1* | 3/2019 | Lu .......................... G01C 21/30 |
| 2019/0359060 A1* | 11/2019 | Satam .................... G06F 3/017 |

* cited by examiner

PARKING CONTROL DEVICE, PARKING CONTROL METHOD, VEHICLE, AND COMPUTER READABLE NON-TRANSITORY RECORDING MEDIUM STORING A PROGRAM

CROSS-REFERENCE TO RELATED APPLICATION

This application is based upon and claims the benefit of priority from Japanese Patent Application No. 2018-167452 filed on Sep. 7, 2018, the contents of which are incorporated herein by reference.

BACKGROUND OF THE INVENTION

Field of the Invention

The present invention relates to a parking control device, a parking control method, a vehicle, and a computer readable non-transitory recording medium in which a program is stored.

Description of the Related Art

Heretofore, a parking assistance system has been proposed which assists parking operations made by a user. Japanese Patent No. 4893162 discloses a parking lot parking assistance system that starts to assist a steering operation when a guided vehicle reaches a position where a vehicle retracting operation should start, and the shift position is placed in a position for enabling retraction.

SUMMARY OF THE INVENTION

However, in the parking lot parking assistance system disclosed in Japanese Patent No. 4893162, in the case that the shift position is set to a position for enabling retraction, assistance for a steering operation is initiated even if the user does not desire the steering operation. Accordingly, in the parking lot parking assistance system disclosed in Japanese Patent No. 4893162, favorable operability may not always be obtained.

An object of the present invention is to provide a parking control device, a parking control method, a vehicle, and a computer readable non-transitory recording medium storing a program, in which favorable operability can be realized.

A parking control device according to one aspect of the present invention comprises a detection unit configured to detect at least one possible parking position in which a vehicle is capable of being parked, and a control unit configured to, after a target parking position has been selected from among the possible parking positions, initiate movement of the vehicle into the target parking position on a basis of an operation over a prolonged time period having been performed by a user, the operation over the prolonged time period being an operation in which an operation input unit is continuously maintained in a predetermined state over a threshold time period or greater, the operation input unit being used at least when switching between forward movement and rearward movement of the vehicle.

A vehicle according to another aspect of the present invention comprises the parking control device as described above.

A parking control method according to yet another aspect of the present invention comprises a step of detecting at least one possible parking position in which a vehicle is capable of being parked, and a step of, after a target parking position has been selected from among the possible parking positions, initiating movement of the vehicle into the target parking position on a basis of an operation over a prolonged time period having been performed by a user, the operation over the prolonged time period being an operation in which an operation input unit is continuously maintained in a predetermined state over a threshold time period or greater, the operation input unit being used at least when switching between forward movement and rearward movement of the vehicle.

According to yet another aspect of the present invention, there is provided a computer readable non-transitory recording medium in which a program is stored for executing in a computer a step of detecting at least one possible parking position in which a vehicle is capable of being parked, and a step of, after a target parking position has been selected from among the possible parking positions, initiating movement of the vehicle into the target parking position on a basis of an operation over a prolonged time period having been performed by a user, the operation over the prolonged time period being an operation in which an operation input unit is continuously maintained in a predetermined state over a threshold time period or greater, the operation input unit being used at least when switching between forward movement and rearward movement of the vehicle.

According to yet another aspect of the present invention, there is provided a computer readable non-transitory recording medium in which a program is stored for executing in a computer a step of displaying, on a display unit, a button configured to cause forward movement or rearward movement of a vehicle, a step of determining whether or not the button has been continuously pressed by a user over a threshold time period or greater, and a step of, after a target parking position has been selected from among at least one possible parking position in which the vehicle is capable of being parked, initiating movement of the vehicle into the target parking position on a basis of the button being continuously pressed by the user over the threshold time period or greater.

According to the present invention, it is possible to provide a parking control device, a parking control method, a vehicle, and a computer readable non-transitory recording medium storing a program, in which favorable operability can be realized.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a parking control device, a parking control method, a vehicle, and a computer readable non-transitory recording medium in which a program is stored according to the present invention will be presented and described in detail below with reference to the accompanying drawings.

EMBODIMENT

Figure 1:
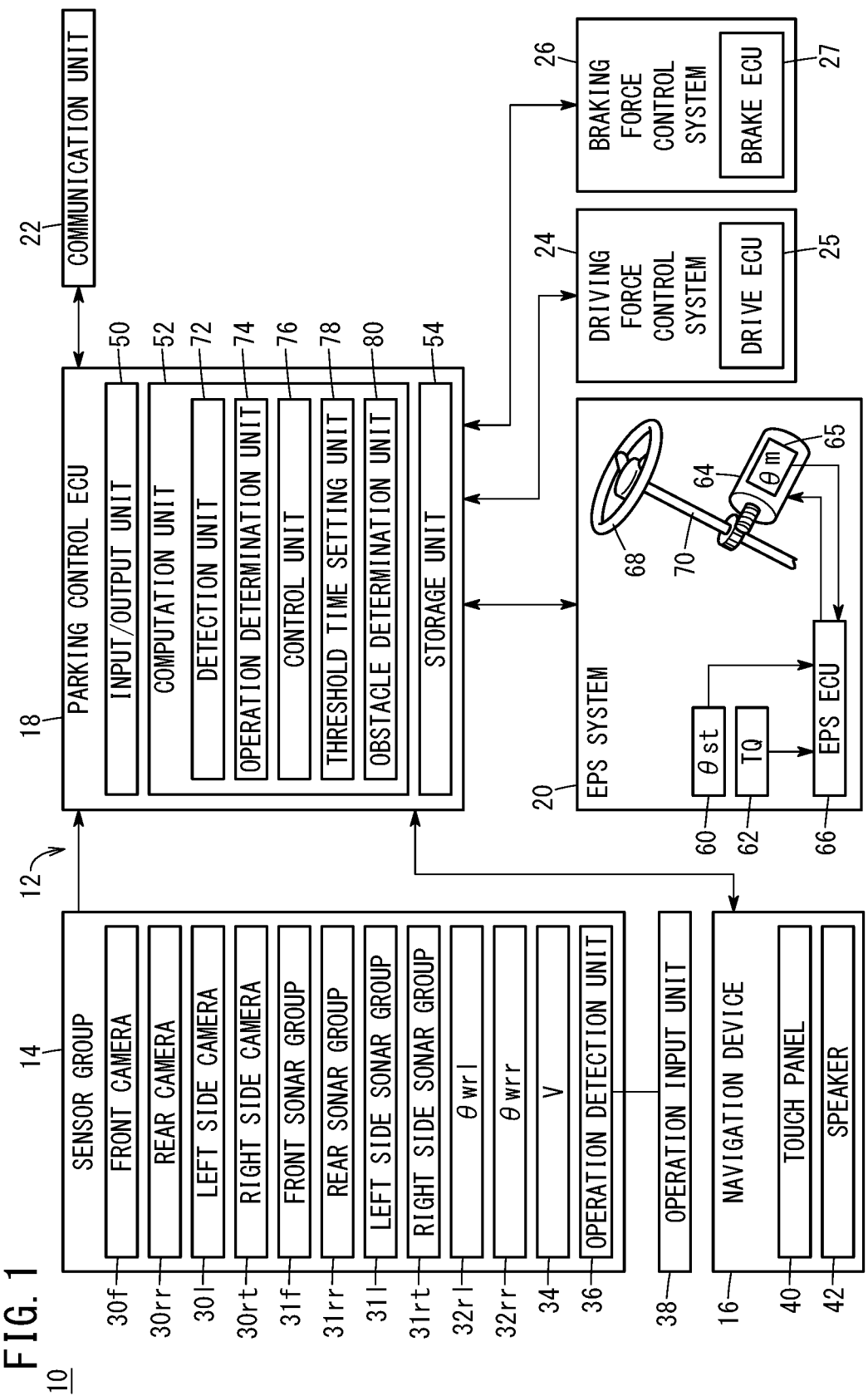
FIG. 1 is a block diagram showing a vehicle equipped with a parking control device according to an embodiment of the present invention.

A parking control device, a parking control method, a vehicle, and a computer readable non-transitory recording medium in which a program is stored according to an embodiment of the present invention will be described below with reference to the drawings. FIG. 1 is a block diagram showing a vehicle equipped with a parking control device according to the embodiment.

A parking control device 12 according to the present embodiment controls parking of a vehicle 10 by performing automated steering. More specifically, operations of a steering wheel 68 are performed automatically by the parking control device 12. In this instance, although a case will be described as an example in which operations of an accelerator pedal (not shown), a brake pedal (not shown), and an operation input unit 38 are performed by a user, the invention is not necessarily limited to this example. For example, driving, braking, and steering may also be performed automatically.

As shown in FIG. 1, the parking control device 12 includes a sensor group 14, a navigation device 16, a parking control ECU (parking control electronic control device) 18, an EPS system (electric power steering system) 20, and a communication unit 22. The parking control device 12 further includes a driving force control system 24 and a braking force control system 26.

The sensor group 14 acquires various detection values used in connection with the parking control. The sensor group 14 includes a front camera 30f, a rear camera 30rr, a left side camera 30l, and a right side camera 30rt. The sensor group 14 further includes a front sonar group 31f, a rear sonar group 31rr, a left side sonar group 31l, and a right side sonar group 31rt. The sensor group 14 also includes vehicle wheel sensors 32rl and 32rr, a vehicle speed sensor 34, and an operation detection unit 36.

The front camera 30f, the rear camera 30rr, the left side camera 30l, and the right side camera 30rt output peripheral images obtained by capturing images of the surrounding periphery around the vehicle 10. The peripheral image captured by the front camera 30f is referred to as a front image. The peripheral image captured by the rear camera 30rr is referred to as a rear image. The peripheral image captured by the left side camera 30l is referred to as a left side image. The peripheral image captured by the right side camera 30rt is referred to as a right side image. A sideways image is constituted by the left side image and the right side image.

The front sonar group 31f, the rear sonar group 31rr, the left side sonar group 31l, and the right side sonar group 31rt emit sound waves around the periphery of the vehicle 10, together with receiving reflected sounds from other objects. The front sonar group 31f includes, for example, four sonar devices. The sonar devices constituting the front sonar group 31f are respectively provided on a diagonally left forward side, a front left side, a front right side, and a diagonally right forward side of the vehicle 10. The rear sonar group 31rr includes, for example, four sonar devices. The sonar devices constituting the rear sonar group 31rr are respectively provided on a diagonally left rearward side, a rear left side, a rear right side, and a diagonally right rearward side of the vehicle 10. The left side sonar group 31l includes, for example, two sonar devices. The sonar devices constituting the left side sonar group 31l are respectively provided on a left forward side and a left rearward side of the vehicle 10. The right side sonar group 31rt includes, for example, two sonar devices. The sonar devices constituting the right side sonar group 31rt are respectively provided on a right forward side and a right rearward side of the vehicle 10.

The vehicle wheel sensors 32rl and 32rr respectively detect the angles of rotation of the vehicle wheels (not shown). The vehicle wheel sensors 32rl and 32rr may be constituted by angle sensors, or alternatively, may be constituted by displacement sensors. The vehicle wheel sensors 32rl and 32rr output detection pulses each time that the vehicle wheels are rotated by a predetermined angle. The detection pulses output from the vehicle wheel sensors 32rl and 32rr can be used to calculate the angles of rotation of the vehicle wheels and the rotational speeds of the vehicle wheels. The distance that the vehicle 10 moves can be calculated based on the angles of rotation of the vehicle wheels. The vehicle wheel sensor 32rl detects, for example, the angle of rotation of the left rear wheel, or stated otherwise, an angle of rotation $\theta$wrl. The vehicle wheel sensor 32rr detects, for example, the angle of rotation of the right rear wheel, or stated otherwise, an angle of rotation $\theta$wrr.

The vehicle speed sensor 34 detects the speed of the vehicle body (not shown) of the vehicle 10, or stated otherwise, a vehicle speed V, and outputs the detected vehicle speed V to the parking control ECU 18. The vehicle speed sensor 34 detects the vehicle speed V on the basis of, for example, the rotation of a transmission counter shaft.

The operation detection unit 36 detects the content of operations performed by the user using the operation input unit 38, and outputs the detected operation content to the parking control ECU 18. In this instance, examples will be described of a case in which the operation input unit 38 is a shift lever (select lever, selector), and a case in which the operation input unit 38 is a shift position sensor. The operation detection unit 36 detects the shift position in the operation input unit 38, and outputs the detected shift position to the parking control ECU 18 or the like.

Figure 2:
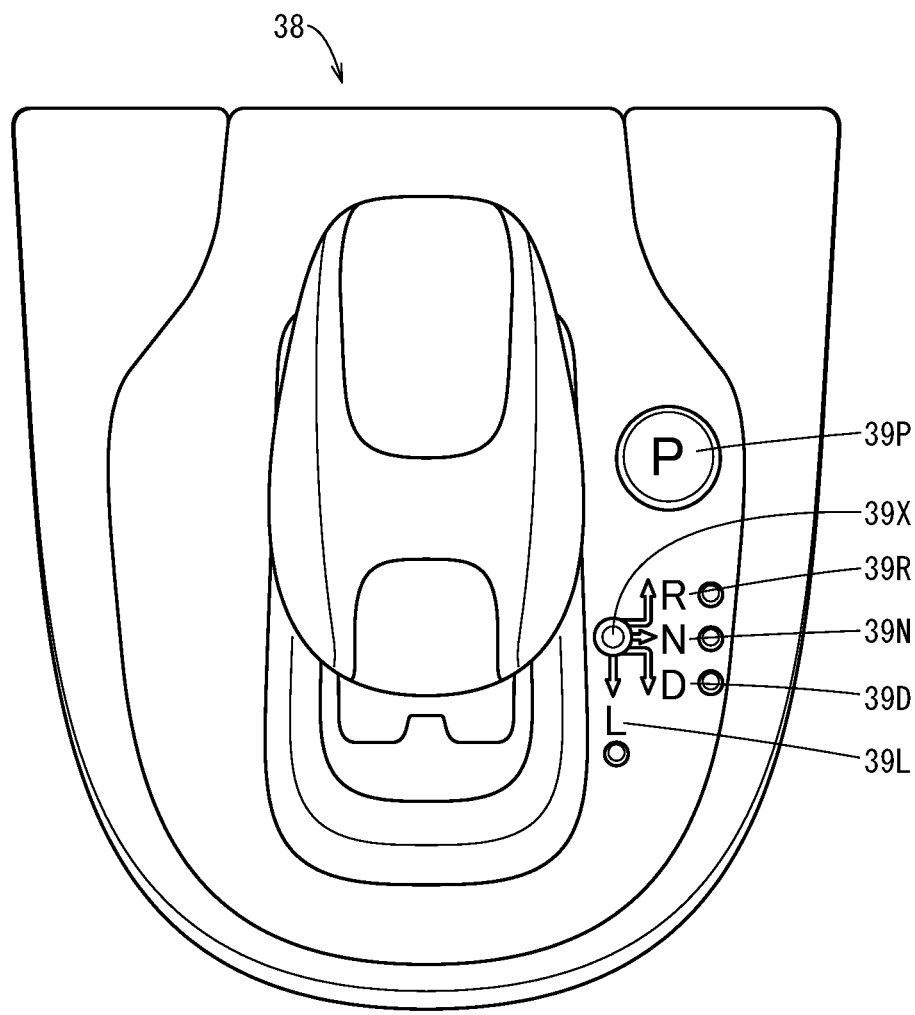
FIG. 2 is a diagram showing an example of an operation input unit.

The operation input unit 38 can be used at least when switching between forward movement and rearward movement of the vehicle 10. FIG. 2 is a diagram showing an example of the operation input unit. As described previously, the operation input unit 38 is a shift lever. The operation input unit 38 comprises a shift position (first shift position) for causing forward movement of the vehicle 10, i.e., a D range 39D. The operation input unit 38 further comprises a shift position (second shift position) for causing rearward movement of the vehicle 10, i.e., an R range 39R. The operation input unit 38 further comprises an L range 39L and an N range 39N. In the vicinity of the operation input unit 38, a P button 39P used for parking is provided. The operation input unit 38 is configured so as to be automatically returned to a neutral position 39X.

The navigation device 16 detects the current position of the vehicle 10 using, for example, a GPS (Global Positioning System), and guides the user along a route to the destination. The navigation device 16 includes a non-illustrated storage device equipped with a map information database.

A touch panel 40 and a speaker 42 are provided in the navigation device 16. The touch panel 40 is capable of functioning as an input device as well as a display device (display unit) of the parking control device 12. The user can input commands in relation to the parking control via the touch panel 40. In addition, a screen regarding the parking control can be displayed on the touch panel 40. Moreover, constituent elements other than the touch panel 40 may be used as the input device or the display device. Further, when the parking control takes place, voice guidance can be performed via the speaker 42. The speaker 42 can function as a notification unit which, prior to initiating movement of the vehicle 10 into a later-described target parking position 84, issues a notification to a passenger that movement of the vehicle 10 is going to be initiated.

The parking control ECU 18 includes an input/output unit 50, a computation unit 52, and a storage unit 54. The computation unit 52 can be constituted, for example, by a CPU (Central Processing Unit). The computation unit 52 executes the parking control by controlling each of the respective units based on programs stored in the storage unit 54.

The computation unit 52 comprises a detection unit 72, an operation determination unit 74, a control unit 76, a threshold time setting unit 78, and an obstacle determination unit 80. The detection unit 72, the operation determination unit 74, the control unit 76, the threshold time setting unit 78, and the obstacle determination unit 80 can be realized by programs, which are stored in the storage unit 54, being executed by the computation unit 52.

Figure 3:
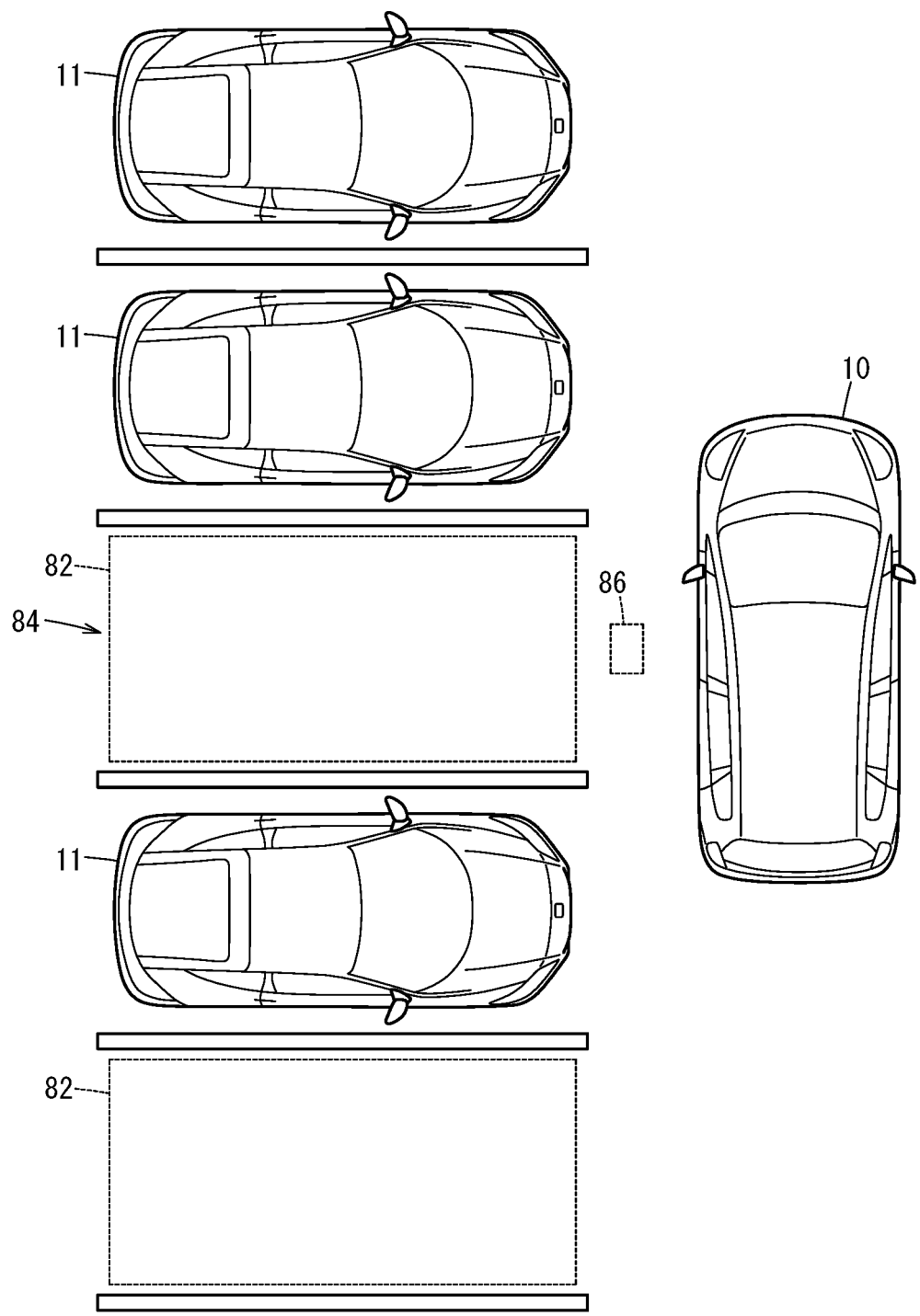
FIG. 3 is a diagram conceptually illustrating an example of a portion of an image displayed on a display screen.

The detection unit 72 detects, on the basis of images and the like acquired by the cameras 30*f*, 30*rr*, 30*l*, and 30*rt*, etc., at least one possible parking position 82 in which the vehicle 10 is capable of being parked. The possible parking positions 82 detected by the detection unit 72 can be displayed on the touch panel 40 of the navigation device 16, for example. FIG. 3 is a diagram conceptually illustrating an example of a portion of an image displayed on a display screen. As shown in FIG. 3, an overhead view image including the vehicle (driver's own vehicle) 10 can be displayed on the display screen of the touch panel 40. As shown in FIG. 3, for example, other vehicles 11 are parked in three parking spaces from among five total parking spaces. Other vehicles 11 are not parked in two of the parking spaces from among the five total parking spaces. The detection unit 72 can detect, as possible parking positions 82, the parking spaces in which other vehicles 11 are not parked. Moreover, such an overhead view image can be generated, for example, by appropriately using the above-described sensor group 14. The target parking position 84 can be selected by the user from among the possible parking positions 82 displayed on the touch panel 40. For example, the target parking position 84 can be selected by the user touching any one of the possible parking positions 82 displayed on the touch panel 40. Moreover, although an exemplary case has been described herein in which the target parking position 84 is selected by the user, the present invention is not limited to this feature. The target parking position 84 may be automatically selected by the control unit 76.

The operation determination unit 74 can determine the content of operations performed by the user on the operation input unit 38. Further, the operation determination unit 74 can determine whether or not an operation over a prolonged time period has been performed by the user on the operation input unit 38. The operation over a prolonged time period is defined as an operation in which the operation input unit 38 is continuously maintained in a predetermined state for a first threshold time period (threshold time period) or greater. The first threshold time period, for example, may be a time period on the order of 3 seconds, however, the present invention is not limited to this feature. Moreover, a second threshold time period for the purpose of determining whether or not the operation input unit 38 has been set to a certain shift position is sufficiently shorter than the first threshold time period for the purpose of determining whether or not the operation over a prolonged time period has been performed.

After the target parking position 84 has been selected, in the case that the operation input unit 38 is continuously maintained in the D range 39D or the R range 39R over the first threshold time period or greater, or stated otherwise, in the case that the operation over a prolonged time period is performed by the user, the control unit 76 carries out the following control. More specifically, in such a case, the control unit 76 initiates movement of the vehicle 10 into the target parking position 84.

The threshold time setting unit 78 sets the first threshold time period for the purpose of determining whether or not the operation over a prolonged time period has been performed. The first threshold time period may be fixed, or may be changed in accordance with an amount of time that has elapsed from the time at which the possible parking positions 82 are detected. The following action may be undertaken, for example, in the case that the first threshold time period for the purpose of determining whether or not the operation over a prolonged time period has been performed is changed in accordance with the amount of time that has elapsed from the time at which the possible parking positions 82 are detected. More specifically, the first threshold time period may be made longer as the amount of time that has elapsed from the time at which the possible parking positions 82 are detected becomes longer.

The obstacle determination unit 80 determines whether or not an obstacle 86 that is capable of coming into contact with the vehicle 10 exists. In the case that the obstacle determination unit 80 determines that an obstacle 86 that is capable of coming into contact with the vehicle 10 exists, the control unit 76 interrupts movement of the vehicle 10 into the target parking position 84. After movement of the vehicle 10 into the target parking position 84 has been interrupted, the control unit 76 restarts movement of the vehicle 10 into the target parking position 84 on the basis of the user having performed the operation over a prolonged time period on the operation input unit 38.

The EPS system 20 includes a steering angle sensor 60, a torque sensor 62, an EPS motor 64, a resolver 65, and an EPS ECU (EPS electronic control unit) 66.

The steering angle sensor 60 detects a steering angle θst of the steering wheel 68. The torque sensor 62 detects a torque TQ applied to the steering wheel 68.

The EPS motor 64 applies a driving force or a reaction force to a steering column 70 connected to the steering wheel 68, thereby enabling assistance of operations of the steering wheel 68 by the driver, and automated steering at the time of the parking control. The resolver 65 detects an angle of rotation θm of the EPS motor 64.

The EPS ECU 66 administers an overall control of the EPS system 20. The EPS ECU 66 is equipped with an input/output unit (not shown), a computation unit (not shown), and a storage unit (not shown).

Figure 6:
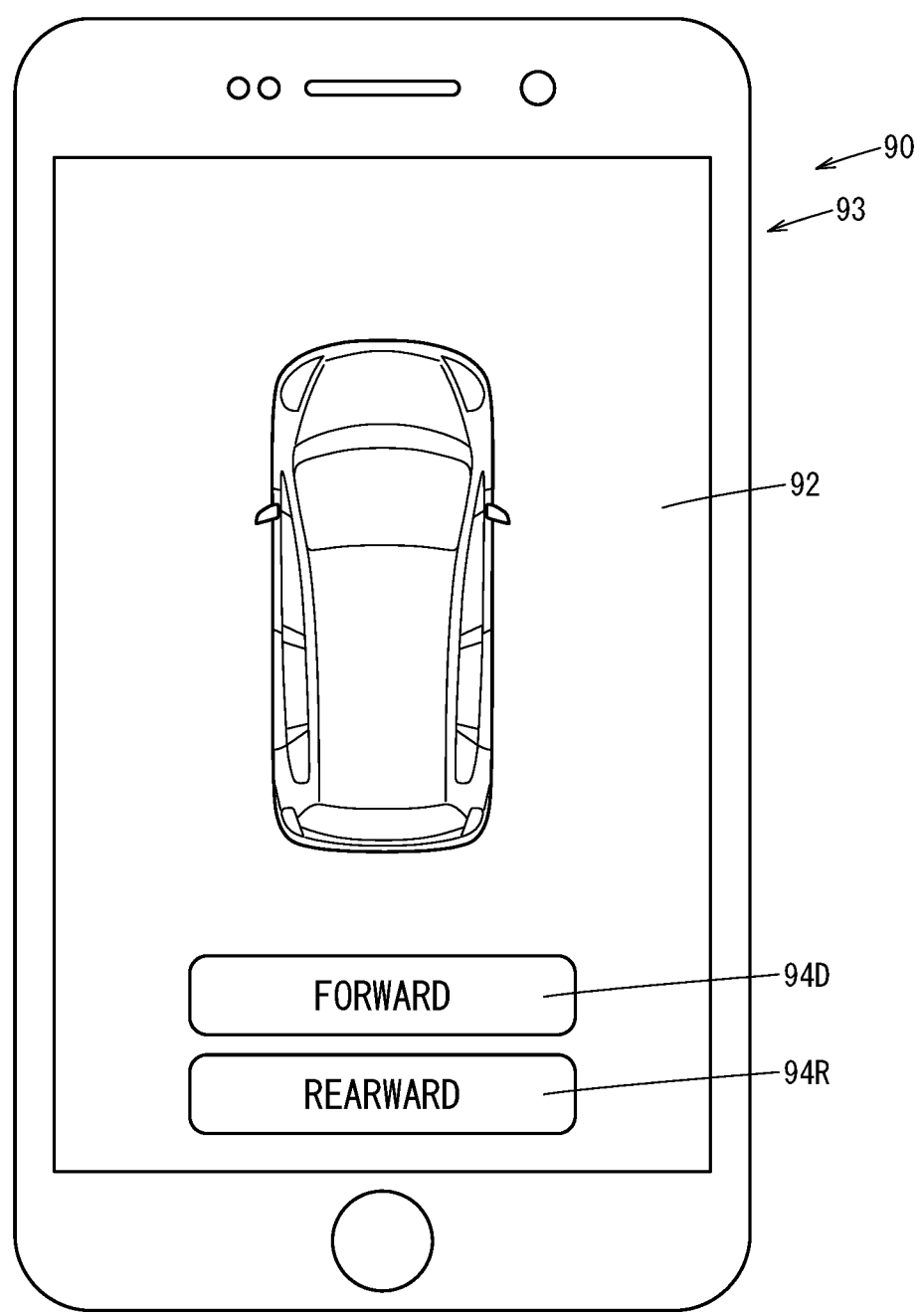
FIG. 6 is a diagram showing an example of a communication terminal used in a second modification of the embodiment.
Figure 7:
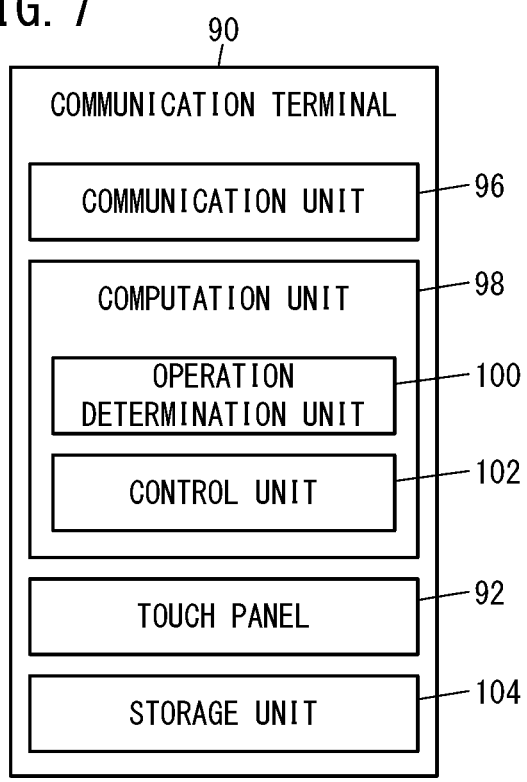
FIG. 7 is a block diagram showing an example of the communication terminal used in the second modification of the embodiment.

The communication unit (wireless communication unit) 22 enables wireless communications with a later-described communication terminal 90 (see FIGS. 6 and 7). The control unit 76 is capable of carrying out communications with the communication terminal 90 via the communication unit 22.

In the parking control that is performed by the parking control device 12 according to the present embodiment, there are included a target parking position setting control (target setting control), and an automated steering control. The target setting control is a control for setting the target parking position 84 for the vehicle 10. The automated steering control is a control for automatically operating the steering wheel 68 in a manner so that the vehicle 10 reaches the target parking position 84. Automated operation of the steering wheel 68 is performed by the EPS ECU 66 controlling the EPS motor 64.

The driving force control system 24 is equipped with a drive ECU 25. The driving force control system 24 executes a driving force control for the vehicle 10. The drive ECU 25 controls the driving force of the vehicle 10 by controlling a non-illustrated engine or the like on the basis of operations performed by the user on a non-illustrated accelerator pedal. The driving force control for the vehicle 10 may also be performed automatically.

The braking force control system 26 is equipped with a brake ECU 27. The braking force control system 26 executes a braking force control for the vehicle 10. The brake ECU 27 controls the braking force of the vehicle 10 by controlling a non-illustrated brake mechanism or the like on the basis of operations performed by the user on a non-illustrated brake pedal. The braking force control for the vehicle 10 may also be performed automatically.

Figure 4:
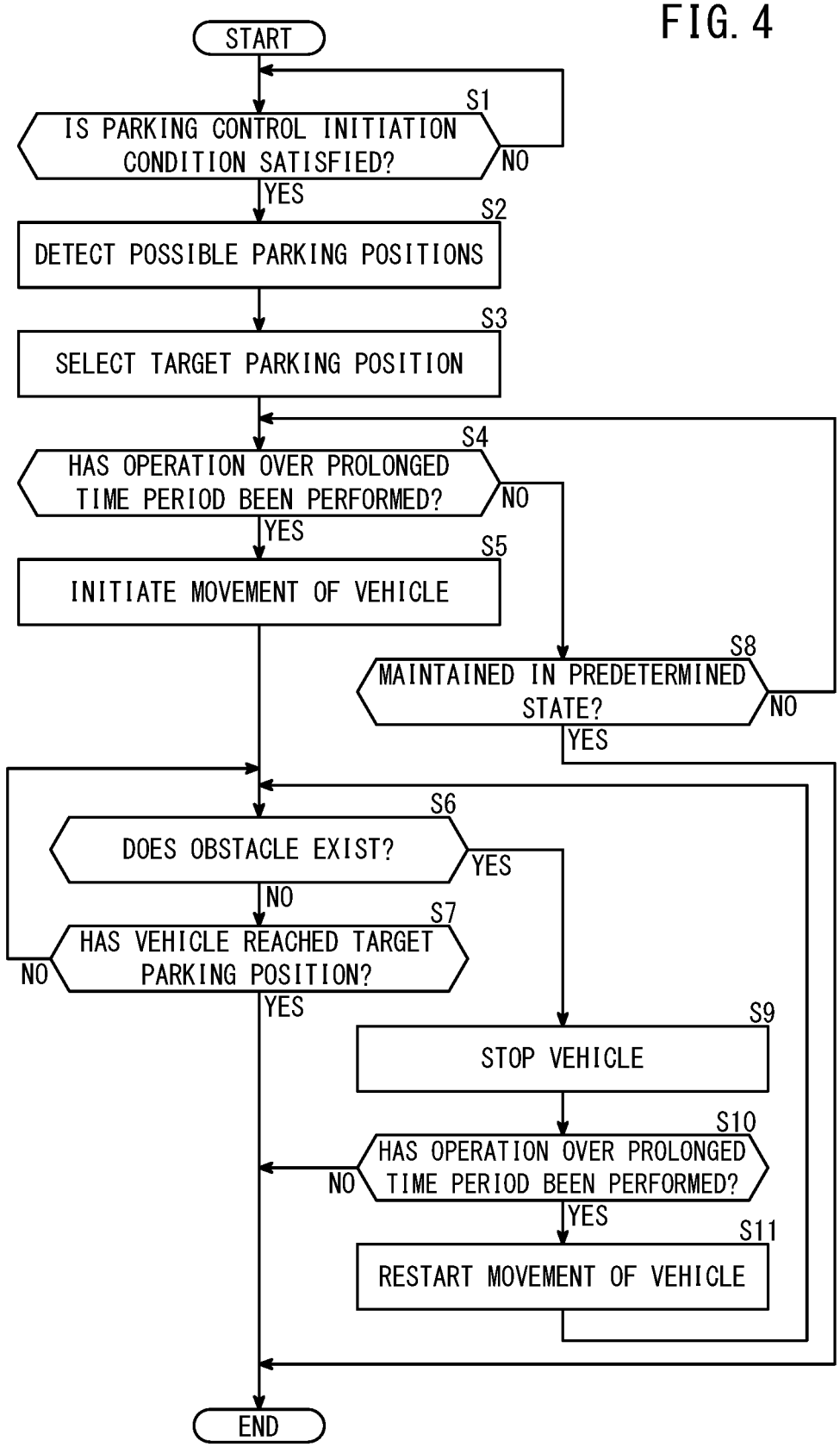
FIG. 4 is a flowchart showing operations of the parking control device according to the embodiment.

FIG. 4 is a flowchart showing operations of the parking control device according to the present embodiment.

In step S1, the control unit 76 determines whether or not a parking control initiation condition has been satisfied. As the parking control initiation condition, there may be cited, for example, a condition that a parking control start button (not shown) which is displayed on the touch panel 40 of the navigation device 16 has been pressed by the user. Moreover, the parking control initiation condition may be a condition that the vehicle speed V has fallen below a predetermined vehicle speed threshold. In the case that the parking control initiation condition has been satisfied (YES in step S1), the process transitions to step S2. In the case that the parking control initiation condition has not been satisfied (NO in step S1), then step S1 is executed again after the elapse of a predetermined time period.

In step S2, the detection unit 72 detects at least one possible parking position (possible parking frame) 82 in which the vehicle 10 is capable of being parked. The parking control ECU 18 carries out a control in a manner so that the detected possible parking positions 82 are displayed on the touch panel 40 of the navigation device 16. Thereafter, the process transitions to step S3.

In step S3, the target parking position 84 is selected from among the possible parking positions 82. The target parking position 84 can be selected by the user touching any one of the possible parking positions 82 displayed on the touch panel 40. Moreover, although an exemplary case has been described herein in which the target parking position 84 is selected by the user, the present invention is not limited to this feature. The target parking position 84 may be automatically selected by the control unit 76. Thereafter, the process transitions to step S4.

In step S4, a determination is made by the operation determination unit 74 as to whether or not the operation over a prolonged time period has been performed by the user on the operation input unit 38. In the case that the parking process can be initiated by causing forward movement of the vehicle 10, a determination is made by the operation determination unit 74 as to whether or not the operation input unit 38 has been continuously maintained, for example, in the D range 39D over the first threshold time period or greater. Moreover, whether or not the parking process can be initiated by causing forward movement of the vehicle 10 can be determined by the control unit 76 on the basis of the current position of the vehicle 10 and the target parking position 84. In the case that the parking process can be initiated by causing rearward movement of the vehicle 10, a determination is made by the operation determination unit 74 as to whether or not the operation input unit 38 has been continuously maintained, for example, in the R range 39R over the first threshold time period or greater. Moreover, whether or not the parking process can be initiated by causing rearward movement of the vehicle 10 can be determined by the control unit 76 on the basis of the current position of the vehicle 10 and the target parking position 84. In the case that the above-described operation over a prolonged time period is performed (YES in step S4), the process transitions to step S5. On the other hand, in the case that the above-described operation over a prolonged time period has not been performed (NO in step S4), the process transitions to step S8. Moreover, the first threshold time period may be changed in accordance with the amount of time that has elapsed from the time at which the possible parking positions 82 are detected. For example, the first threshold time period may be made longer as the amount of time that has elapsed from the time at which the possible parking positions 82 are detected becomes longer. In the case that the amount of time that has elapsed from the time at which the possible parking positions 82 are detected becomes longer, it is frequently the case that the user does not desire for the parking control to be executed. By making the first threshold time period longer in accordance with the amount of time that has elapsed from the time at which the possible parking positions 82 are detected, it is possible to prevent a situation in which the parking control is performed in spite of the fact that the user does not desire for the parking control to be executed.

In step S5, the control unit 76 initiates movement of the vehicle 10 into the target parking position 84. More specifically, the control unit 76 executes an automated steering control so as to automatically operate the steering wheel 68 in a manner so that the vehicle 10 reaches the target parking position 84. Operations of the accelerator pedal (not shown) and the brake pedal (not shown) are performed by the user. Moreover, in this instance, although an exemplary case has been described in which operations of driving and braking the vehicle 10 are performed by the user, the present invention is not limited to this feature. Controls for driving and braking the vehicle 10 may also be performed automatically. Automated operation of the steering wheel 68 is performed by the EPS ECU 66 controlling the EPS motor 64. Moreover, prior to initiation of movement of the vehicle 10 into the target parking position 84, a notification may be issued to a passenger concerning initiation of movement of the vehicle 10. Thereafter, the process transitions to step S6.

In step S6, the obstacle determination unit 80 determines whether or not an obstacle 86 (see FIG. 3) that is capable of coming into contact with the vehicle 10 exists. In the case that the obstacle determination unit 80 determines that an obstacle 86 that is capable of coming into contact with the vehicle 10 exists (YES in step S6), the control unit 76 interrupts movement of the vehicle 10 into the target parking position 84. In this case, the process transitions to step S9. In the case that the obstacle determination unit 80 has not determined that an obstacle 86 that is capable of coming into contact with the vehicle 10 exists (NO in step S6), the control unit 76 continues moving the vehicle 10 into the target parking position 84.

In step S7, the control unit 76 determines whether or not the vehicle 10 has reached the target parking position 84. In the case that the vehicle 10 has reached the target parking position 84 (YES in step S7), the control unit 76 terminates the parking control. In the case that the vehicle 10 has not reached the target parking position 84 (NO in step S7), the process returns to step S6, and the parking control is continued.

In step S8, the operation determination unit 74 determines whether or not an operation has been performed by the user on the operation input unit 38. In step S8, a determination is made as to whether or not an operation for a relatively short time period has been performed on the operation input unit 38, instead of a continuous operation over the first threshold time period or greater that is determined to be the operation over a prolonged time period. More specifically, the operation determination unit 74 determines whether or not an operation on the operation input unit 38 has been performed over the second threshold time period or greater which is sufficiently shorter than the first threshold time period. In the case that such an operation on the operation input unit 38 has been performed (YES in step S8), the control unit 76 terminates the parking control. On the other hand, in the case that such an operation on the operation input unit 38 has not been performed (NO in step S8), the process returns to step S4.

In step S9, the control unit 76 issues a notification for prompting the user to stop the vehicle 10. In accordance with such a notification, the brake pedal is operated by the user and the vehicle 10 is stopped. Moreover, in this instance, although an exemplary case has been described in which the operation of braking the vehicle 10 is performed by the user, the present invention is not limited to this feature. The control for braking the vehicle 10 may also be performed automatically. Thereafter, the control unit 76 carries out a control in a manner so that a predetermined message is notified to the user. In order to issue such a notification of the message, the speaker 42 may be used, or the display screen of the touch panel 40 may be used. The concerned message is a message for notifying the user that the parking control will be restarted if the operation over a prolonged time period is performed on the operation input unit 38. Thereafter, the process transitions to step S10.

In step S10, the operation determination unit 74 determines whether or not an operation over a prolonged time period has been performed by the user on the operation input unit 38. As noted previously, the operation over a prolonged time period is defined as an operation in which the operation input unit 38 is continuously maintained in a predetermined state over the first threshold time period or greater. More specifically, as described above, the operation over a prolonged time period is an operation in which the operation input unit 38 is continuously maintained in the D range (first shift position) 39D or the R range (second shift position) 39R over the first threshold time period or greater. In the case that such an operation over a prolonged time period is performed (YES in step S10), the process transitions to step S11. On the other hand, in the case that such an operation over a prolonged time period has not been performed (NO in step S10), the control unit 76 terminates the parking control.

In step S11, the control unit 76 performs a control in a manner so that movement of the vehicle 10 is restarted. Operations of the accelerator pedal and the brake pedal are performed by the user. Moreover, in this instance, although an exemplary case has been described in which operations of driving and braking the vehicle 10 are performed by the user, the present invention is not limited to this feature. Controls for driving and braking the vehicle 10 may also be performed automatically. Thereafter, the process transitions to step S6.

In the foregoing manner, the parking control according to the present embodiment is executed.

In this manner, according to the present embodiment, after the target parking position 84 has been selected from among the possible parking positions 82, movement of the vehicle 10 into the target parking position 84 is initiated on the basis of the user having performed the operation over a prolonged time period on the operation input unit 38. According to the present embodiment, since the operation over a prolonged time period may be performed on the operation input unit 38, it is possible to provide a parking control device in which operability is favorable. Since there is no need to provide, separately from the operation input unit 38, an operating means for the purpose of instructing that the vehicle 10 be moved into the target parking position 84, it is possible to contribute to a reduction in costs or the like according to the present embodiment.

First Modification

Figure 5:
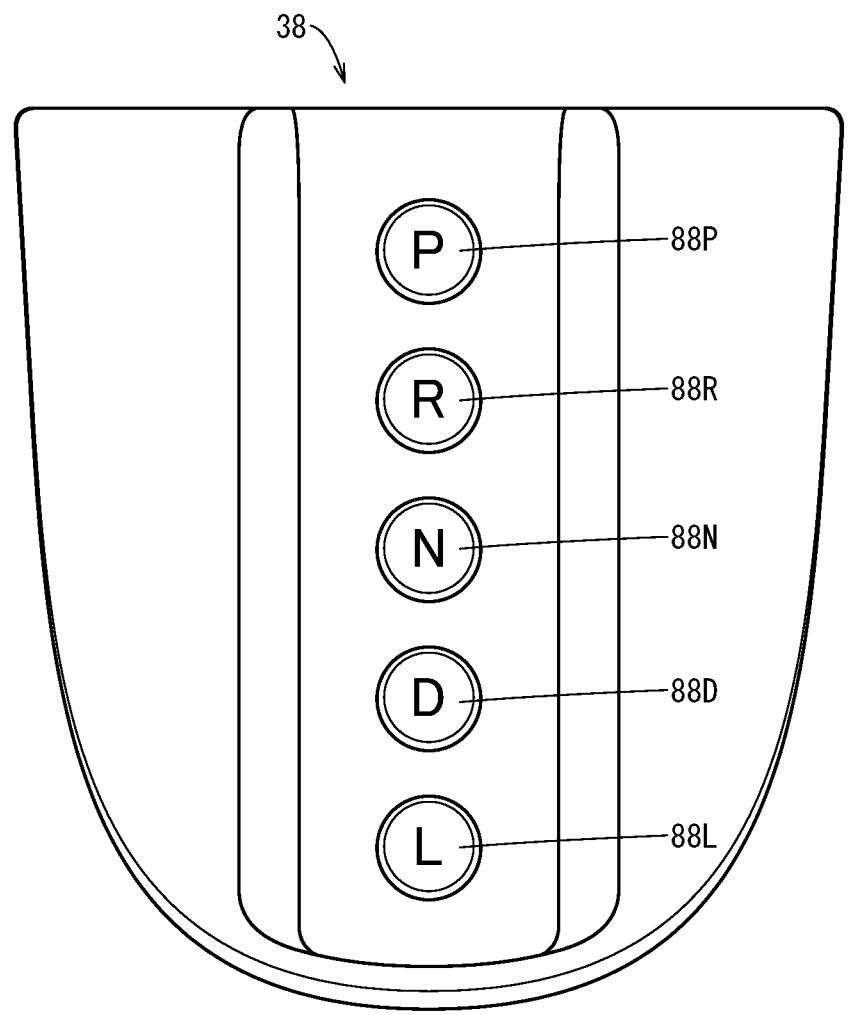
FIG. 5 is a diagram showing an example of an operation input unit according to a first modification of the embodiment.

A parking control device, a parking control method, a vehicle, and a computer readable non-transitory recording medium in which a program is stored according to a first modification of the present embodiment will be described with reference to FIG. 5. FIG. 5 is a diagram showing an example of the operation input unit according to the present modification.

In the parking control device according to the present modification, the operation input unit 38 is constituted by a shift switch.

As shown in FIG. 5, the operation input unit 38 according to the present modification is a shift switch. The operation input unit 38 is equipped with a D button (first button) 88D for causing forward movement of the vehicle 10, and an R button (second button) 88R for causing rearward movement of the vehicle 10. The operation input unit 38 is further equipped with an L button 88L, an N button 88N, and a P button 88P.

In the present modification, the operation over a prolonged time period is pressing the D button 88D or the R button 88R over a prolonged time period.

In the foregoing manner, the operation input unit 38 may be constituted by the shift switch. According to the present modification, since the D button 88D or the R button 88R may be pressed over a prolonged time period, it is possible to provide the parking control device 12 in which operability is favorable. In the present modification as well, since there is no need to provide, separately from the operation input unit 38, an operating means for the purpose of instructing that the vehicle 10 be moved into the target parking position 84, it is possible to contribute to a reduction in costs or the like.

Second Modification

A parking control device according to a second modification of the present embodiment will be described with reference to FIGS. 6 and 7. FIG. 6 is a diagram showing an example of a communication terminal used in the present modification. FIG. 7 is a block diagram showing an example of the communication terminal used in the present modification.

In the present modification, parking of the vehicle 10 can be instructed using the communication terminal 90 which is capable of communicating with the control unit 76 via the communication unit 22. According to the present modification, a touch panel 92 provided in the communication terminal 90 is capable of functioning as an operation input unit 93.

The communication terminal 90, for example, is a mobile communication terminal equipped with a telephone function. Such a communication terminal 90 is referred to as a smart phone. Moreover, the communication terminal 90 is not limited to being a smart phone. The communication terminal 90 may be a communication terminal, for example, a remote controller or the like, which is not equipped with a telephone function.

The communication terminal 90 is equipped with a communication unit 96, a computation unit 98, the touch panel 92, and a storage unit 104. The computation unit 98 comprises an operation determination unit 100 and a control unit 102. The operation determination unit 100 and the control unit 102 can be realized by programs, which are stored in the storage unit 104, being executed by the computation unit 98. As described previously, the touch panel 92 is capable of functioning as the operation input unit 93.

On the display screen of the touch panel 92, for example, a button for causing forward movement of the vehicle 10, i.e., a forward movement button 94D can be displayed. Further, on the display screen of the touch panel 92, a button for causing rearward movement of the vehicle 10, i.e., a rearward movement button 94R can be displayed.

The operation determination unit 100 determines whether or not the user has performed the operation over a prolonged time period on the forward movement button 94D or the rearward movement button 94R that are displayed on the display screen of the touch panel 92. In the present modification, the operation over a prolonged time period is pressing the forward movement button 94D or the rearward movement button 94R over a prolonged time period.

Operations of the parking control device according to the present modification will be described with reference to FIG. 4.

In step S1, the control unit 76 determines whether or not a parking control initiation condition has been satisfied. As the parking control initiation condition, there may be cited, for example, a condition that a parking control start button (not shown) which is displayed on the touch panel 92 has been pressed by the user. In the case that the parking control initiation condition has been satisfied (YES in step S1), the process transitions to step S2. In the case that the parking control initiation condition has not been satisfied (NO in step S1), then step S1 is executed again after the elapse of a predetermined time period.

In step S2, the detection unit 72 detects at least one possible parking position 82 in which the vehicle 10 is capable of being parked. The control unit 76 performs a control in a manner so that information indicative of the possible parking positions 82 is transmitted via the communication unit 22. At this time, the control unit 76 also transmits, via the communication unit 22, information indicative of the current position of the vehicle 10. The control unit 102 receives the information indicative of the possible parking positions 82 via the communication unit 96. At this time, the control unit 102 also receives, via the communication unit 96, the information indicative of the current position of the vehicle 10. In addition, the control unit 102 performs a control in a manner so that the information indicative of the possible parking positions 82 is displayed on the display screen of the touch panel 92. Thereafter, the process transitions to step S3.

In step S3, the target parking position 84 is selected from among the possible parking positions 82. The target parking position 84 (see FIG. 3) can be selected by the user touching any one of the possible parking positions 82 (see FIG. 3) displayed on the display screen of the touch panel 92. Moreover, although an exemplary case has been described herein in which the target parking position 84 is selected by the user, the present invention is not limited to this feature. The target parking position 84 may be automatically selected by the control unit 76 or the control unit 102. Thereafter, the process transitions to step S4.

In step S4, a determination is made by the operation determination unit 100 as to whether or not the operation over a prolonged time period has been performed by the user on the operation input unit 93. In the case that the parking process can be initiated by causing forward movement of the vehicle 10, a determination is made by the operation determination unit 100 as to whether or not the forward movement button 94D has been continuously pressed by the user over the first threshold time period or greater. Moreover, whether or not the parking process can be initiated by causing forward movement of the vehicle 10 can be determined by the control unit 102 on the basis of the current position of the vehicle 10 and the target parking position 84. In the case that the parking process can be initiated by causing rearward movement of the vehicle 10, a determination is made by the operation determination unit 100 as to whether or not the rearward movement button 94R has been continuously pressed by the user over the first threshold time period or greater. Moreover, whether or not the parking process can be initiated by causing rearward movement of the vehicle 10 can be determined by the control unit 102 on the basis of the current position of the vehicle 10 and the target parking position 84. In the case that the above-described operation over a prolonged time period is performed (YES in step S4), the process transitions to step S5. On the other hand, in the case that the above-described operation over a prolonged time period has not been performed (NO in step S4), the process transitions to step S8.

In step S5, the control unit 76 carries out a control so as to initiate movement of the vehicle 10 into the target parking position 84. According to the present modification, the driving control, the braking control, and the steering control of the vehicle 10 are performed automatically. Thereafter, the process transitions to step S6.

In step S6, the obstacle determination unit 80 determines whether or not an obstacle 86 (see FIG. 3) that is capable of coming into contact with the vehicle 10 exists. In the case that the obstacle determination unit 80 determines that an obstacle 86 that is capable of coming into contact with the vehicle 10 exists (YES in step S6), the control unit 76 interrupts movement of the vehicle 10 into the target parking position 84. In this case, the process transitions to step S9. In the case that the obstacle determination unit 80 has not determined that an obstacle 86 that is capable of coming into contact with the vehicle 10 exists (NO in step S6), the control unit 76 continues moving the vehicle 10 into the target parking position 84.

In step S7, the control unit 76 determines whether or not the vehicle 10 has reached the target parking position 84. In the case that the vehicle 10 has reached the target parking position 84 (YES in step S7), the control unit 76 terminates the parking control. In the case that the vehicle 10 has not reached the target parking position 84 (NO in step S7), the process returns to step S6, and the parking control is continued.

In step S8, the operation determination unit 100 determines whether or not an operation has been performed by the user on the operation input unit 93 that is constituted by the communication terminal 90. In step S8, a determination is made as to whether or not an operation for a relatively short time period has been performed on the operation input unit 93, instead of a continuous operation over the first threshold time period or greater that is determined to be the operation over a prolonged time period. More specifically, the operation determination unit 100 determines whether or not an operation on the operation input unit 93 has been performed over the second threshold time period or greater which is sufficiently shorter than the first threshold time period. In the case that such an operation on the operation input unit 93 has been performed (YES in step S8), the control unit 76 terminates the parking control. On the other hand, in the case that such an operation on the operation input unit 93 has not been performed (NO in step S8), the process returns to step S4.

In step S9, the control unit 76 performs a control in a manner so that the vehicle 10 is stopped. According to the present modification, the braking control of the vehicle 10 is performed automatically. Thereafter, the control unit 76 transmits, via the communication unit 22, information indicating that movement of the vehicle 10 into the target parking position 84 has been interrupted. The control unit 102 receives the concerned information via the communication unit 96. The control unit 102 performs a control in a manner so that a message indicating that movement of the vehicle 10 into the target parking position 84 has been interrupted is displayed on the display screen of the touch panel 92. Further, the control unit 102 performs a control in a manner so that a message for notifying the user that the parking control can be restarted by performing the operation over a prolonged time period on the operation input unit 93, is displayed on the touch panel 92. Thereafter, the process transitions to step S10.

In step S10, the operation determination unit 100 determines whether or not an operation over a prolonged time period has been performed by the user on the operation input unit 93. In the present modification, the operation over a prolonged time period is, as described above, pressing the forward movement button 94D or the rearward movement button 94R over a prolonged time period. The control unit 102 transmits information indicative of the determination result by the operation determination unit 100 via the communication unit 96. The concerned information is supplied to the control unit 76 via the communication unit 22. In the case that the above-described operation over a prolonged time period has been performed on the operation input unit 93 (YES in step S10), the process transitions to step S11. On the other hand, in the case that the above-described operation over a prolonged time period has not been performed on the operation input unit 93 (NO in step S10), the control unit 76 terminates the parking control.

In step S11, the control unit 76 restarts movement of the vehicle 10. The driving control, the braking control, and the steering control of the vehicle 10 are performed automatically. Thereafter, the process transitions to step S6.

In the foregoing manner, the parking control according to the present modification is executed.

In the manner described above, the operation input unit 93 may be constituted by the touch panel 92 that is displayed on the communication terminal 90. According to the present modification, since the forward movement button 94D or the rearward movement button 94R may be pressed over a prolonged time period, it is possible to provide the parking control device 12 in which operability is favorable.

Modified Embodiments

Although preferred embodiments of the present invention have been described above, the present invention is not limited to the above-described embodiments, and various modifications can be made thereto without departing from the essence and gist of the present invention.

For example, according to the above-described embodiment, although an exemplary case has been described in which the forward movement button 94D and the rearward movement button 94R are displayed on the touch panel 92, the present invention is not limited to this feature. The forward movement button 94D or the rearward movement button 94R may be configured by a normal push button or the like.

Further, according to the above-described embodiment, an exemplary case has been described in which, in the case that the parking process can be initiated by causing forward movement of the vehicle 10, movement of the vehicle 10 is initiated on the basis of the operation input unit 38 being continuously maintained in the D range 39D over the first threshold time period or greater. However, the present invention is not necessarily limited to this feature. Movement of the vehicle 10 into the target parking position 84 may also be initiated on the basis of the operation input unit 38 being continuously maintained in a range other than the D range 39D over the first threshold time period or greater.

Further, according to the above-described embodiment, an exemplary case has been described in which, in the case that the parking process can be initiated by causing rearward movement of the vehicle 10, movement of the vehicle 10 is initiated on the basis of the operation input unit 38 being continuously maintained in the R range 39R over the first threshold time period or greater. However, the present invention is not necessarily limited to this feature. Movement of the vehicle 10 into the target parking position 84 may also be initiated on the basis of the operation input unit 38 being continuously maintained in a range other than the R range 39R over the first threshold time period or greater.

Further, according to the above-described embodiment, an exemplary case has been described in which, in the case that the parking process can be initiated by causing forward movement of the vehicle 10, movement of the vehicle 10 is initiated on the basis of the D button 88D being continuously pressed over the first threshold time period or greater. However, the present invention is not necessarily limited to this feature. Movement of the vehicle 10 into the target parking position 84 may also be initiated on the basis of a button other than the D button 88D from among the buttons provided on the operation input unit 38 being continuously pressed over the first threshold time period or greater.

Further, according to the above-described embodiment, an exemplary case has been described in which, in the case that the parking process can be initiated by causing rearward movement of the vehicle 10, movement of the vehicle 10 is initiated on the basis of the R button 88R being continuously pressed over the first threshold time period or greater. However, the present invention is not necessarily limited to this feature. Movement of the vehicle 10 into the target parking position 84 may also be initiated on the basis of a button other than the R button 88R from among the buttons provided on the operation input unit 38 being continuously pressed over the first threshold time period or greater.

Further, according to the above-described embodiment, an exemplary case has been described in which, in the case that the parking process can be initiated by causing forward movement of the vehicle 10, movement of the vehicle 10 is initiated on the basis of the forward movement button 94D being continuously pressed over the first threshold time period or greater. However, the present invention is not necessarily limited to this feature. Movement of the vehicle 10 into the target parking position 84 may also be initiated on the basis of a button other than the forward movement button 94D from among the buttons provided on the operation input unit 93 being continuously pressed over the first threshold time period or greater.

Further, according to the above-described embodiment, an exemplary case has been described in which, in the case that the parking process can be initiated by causing rearward movement of the vehicle 10, movement of the vehicle 10 is initiated on the basis of the rearward movement button 94R being continuously pressed over the first threshold time period or greater. However, the present invention is not necessarily limited to this feature. Movement of the vehicle 10 into the target parking position 84 may also be initiated on the basis of a button other than the rearward movement button 94R from among the buttons provided on the operation input unit 93 being continuously pressed over the first threshold time period or greater.

Summarizing the embodiments described above, the following features and advantages are realized.

The parking control device (12) includes the detection unit (72) configured to detect at least one possible parking position (82) in which the vehicle (10) is capable of being parked, and the control unit (76) configured to, after a target parking position (84) has been selected from among the possible parking positions, initiate movement of the vehicle into the target parking position on the basis of an operation over a prolonged time period having been performed by the user, the operation over the prolonged time period being an operation in which the operation input unit (38) is continuously maintained in a predetermined state over a threshold time period or greater, the operation input unit being used at least when switching between forward movement and rearward movement of the vehicle. In accordance with such a configuration, since the operation over the prolonged time period may be performed on the operation input unit, it is possible to provide a parking control device in which operability is favorable. Further, in accordance with such a configuration, since there is no need to provide, separately from the operation input unit, an operating means for the purpose of instructing that the vehicle be moved into the target parking position, it is possible to contribute to a reduction in costs or the like.

The operation input unit may be a shift lever comprising at least the shift position (39D, 39R) for causing forward movement or rearward movement of the vehicle, and configured to be automatically returned to the neutral position (39X), and the operation over the prolonged time period may be an operation of continuously maintaining the shift lever at the shift position over the threshold time period or greater. In accordance with such a configuration, the shift lever can be used to instruct movement of the vehicle into the target parking position.

The operation input unit may be a shift switch that comprises at least the button (88D, 88R) configured to cause forward movement or rearward movement of the vehicle, and the operation over the prolonged time period may be pressing the button over the prolonged time period. In accordance with such a configuration, since the button may be pressed over the prolonged time period, it is possible to provide a parking control device in which operability is favorable. In accordance with such a configuration, the shift switch can be used to instruct movement of the vehicle into the target parking position.

The operation input unit may be provided in the communication terminal (90) configured to communicate with the control unit via the communication unit (22) provided in the vehicle, and may comprise at least the button (94D, 94R) configured to cause forward movement or rearward movement of the vehicle, and the operation over the prolonged time period may be pressing the button over the prolonged time period. In accordance with such a configuration, the communication terminal can be used to instruct movement of the vehicle into the target parking position.

The communication terminal may comprise the display unit (92), and the button may be displayed on the display unit. In accordance with such a configuration, it is possible to provide a parking control device in which operability is more favorable.

The threshold time setting unit (78) configured to set the threshold time period may further be included, and the threshold time setting unit may be configured to change the threshold time period in accordance with an amount of time that has elapsed from the time at which the possible parking positions are detected. In accordance with such a configuration, it is possible to reliably prevent a situation in which the parking control is performed in spite of the fact that the user does not desire for the parking control to be executed.

There may further be included the notification unit (42) configured to, before movement of the vehicle into the target parking position is initiated, issue a notification to the passenger concerning initiation of movement of the vehicle. In accordance with such a configuration, the parking control can be carried out without causing the user to experience a sense of discomfort.

There may further be included the obstacle determination unit (80) configured to determine whether or not an obstacle that is capable of coming into contact with the vehicle exists. The control unit may be configured to interrupt movement of the vehicle into the target parking position in the case that the obstacle determination unit has determined that an obstacle that is capable of coming into contact with the vehicle exists, and may be configured to, after movement of the vehicle into the target parking position has been interrupted, restart movement of the vehicle into the target parking position on the basis of the operation over the prolonged time period having been performed by the user on the operation input unit. In accordance with such a configuration, it is possible to prevent the parking control from being carried out again from the start.

The vehicle (10) includes the above-described parking control device.

The parking control method comprises a step (step S2) of detecting at least one possible parking position in which a vehicle is capable of being parked, and a step (step S5) of, after a target parking position has been selected from among the possible parking positions, initiating movement of the vehicle into the target parking position on the basis of an operation over a prolonged time period having been performed by the user, the operation over the prolonged time period being an operation in which the operation input unit is continuously maintained in a predetermined state over a threshold time period or greater, the operation input unit being used at least when switching between forward movement and rearward movement of the vehicle.

In a computer readable non-transitory recording medium, a program is stored for executing in a computer a step of detecting at least one possible parking position in which a vehicle is capable of being parked, and a step of, after a target parking position has been selected from among the possible parking positions, initiating movement of the vehicle into the target parking position on the basis of an operation over a prolonged time period having been performed by the user, the operation over the prolonged time period being an operation in which the operation input unit is continuously maintained in a predetermined state over a threshold time period or greater, the operation input unit being used at least when switching between forward movement and rearward movement of the vehicle.

In a computer readable non-transitory recording medium, a program is stored for executing in a computer a step of displaying, on a display unit, a button configured to cause forward movement or rearward movement of a vehicle, a step of determining whether or not the button has been continuously pressed by a user over a threshold time period or greater, and a step of, after a target parking position has been selected from among at least one possible parking position in which the vehicle is capable of being parked, initiating movement of the vehicle into the target parking position on the basis of the button being continuously pressed by the user over the threshold time period or greater.

What is claimed is:

1. A parking control device, comprising:
    a detection unit configured to detect at least one possible parking position in which a vehicle is capable of being parked; and
    a control unit configured to, after a target parking position has been selected from among the possible parking positions, initiate movement of the vehicle into the target parking position on a basis of an operation over a prolonged time period having been performed by a user, the operation over the prolonged time period being an operation in which an operation input unit is continuously maintained in a predetermined state over a first threshold time period or greater, the operation input unit being used at least when switching between forward movement and rearward movement of the vehicle, wherein
    an operation with respect to the operation input unit is determined to be performed in a case where the operation on the operation input unit is performed over a second threshold time period, the first threshold time period being greater than the second threshold time period.

2. The parking control device according to claim 1, wherein:
    the operation input unit is a shift lever comprising at least a shift position for causing forward movement or rearward movement of the vehicle, and configured to be automatically returned to a neutral position; and
    the operation over the prolonged time period is an operation of continuously maintaining the shift lever at the shift position over first the threshold time period or greater.

3. The parking control device according to claim 1, wherein:
    the operation input unit is a shift switch comprising at least a button configured to cause forward movement or rearward movement of the vehicle; and
    the operation over the prolonged time period is pressing the button over the prolonged time period.

4. The parking control device according to claim 1, wherein:
    the operation input unit is provided in a communication terminal configured to communicate with the control unit via a communication unit provided in the vehicle, and comprises at least a button configured to cause forward movement or rearward movement of the vehicle; and
    the operation over the prolonged time period is pressing the button over the prolonged time period.

5. The parking control device according to claim 4, wherein:
    the communication terminal comprises a display unit; and
    the button is displayed on the display unit.

6. The parking control device according to claim 1, further comprising a first threshold time setting unit configured to set the first threshold time period,
    wherein the first threshold time setting unit is configured to change the first threshold time period in accordance with an amount of time that has elapsed from a time at which the possible parking positions are detected.

7. The parking control device according to claim 1, further comprising a notification unit configured to, before movement of the vehicle into the target parking position is initiated, issue a notification to a passenger concerning initiation of movement of the vehicle.

8. The parking control device according to claim 1, further comprising an obstacle determination unit configured to determine whether or not an obstacle that is capable of coming into contact with the vehicle exists,
    wherein the control unit is configured to interrupt movement of the vehicle into the target parking position in a case that the obstacle determination unit has determined that the obstacle that is capable of coming into contact with the vehicle exists, and is configured to, after movement of the vehicle into the target parking position has been interrupted, restart movement of the vehicle into the target parking position on a basis of the operation over the prolonged time period having been performed by the user on the operation input unit.

9. A vehicle comprising a parking control device, the parking control device comprising:
    a detection unit configured to detect at least one possible parking position in which a vehicle is capable of being parked; and
    a control unit configured to, after a target parking position has been selected from among the possible parking positions, initiate movement of the vehicle into the target parking position on a basis of an operation over a prolonged time period having been performed by a user, the operation over the prolonged time period being an operation in which an operation input unit is continuously maintained in a predetermined state over a first threshold time period or greater, the operation input unit being used at least when switching between forward movement and rearward movement of the vehicle, wherein an operation with respect to the operation input unit is determined to be performed in a case where the operation on the operation input unit is performed over a second threshold time period, the first threshold time period being greater than the second threshold time period.

10. A parking control method, comprising:

a step of detecting at least one possible parking position in which a vehicle is capable of being parked; and a step of, after a target parking position has been selected from among the possible parking positions, initiating movement of the vehicle into the target parking position on a basis of an operation over a prolonged time period having been performed by a user, the operation over the prolonged time period being an operation in which an operation input unit is continuously maintained in a predetermined state over a first threshold time period or greater, the operation input unit being used at least when switching between forward movement and rearward movement of the vehicle, wherein an operation with respect to the operation input unit is determined to be performed in a case where the operation on the operation input unit is performed over a second threshold time period, the first threshold time period being greater than the second threshold time period.

11. A computer readable non-transitory recording medium in which a program is stored for executing in a computer:

a step of detecting at least one possible parking position in which a vehicle is capable of being parked; and a step of, after a target parking position has been selected from among the possible parking positions, initiating movement of the vehicle into the target parking position on a basis of an operation over a prolonged time period having been performed by a user, the operation over the prolonged time period being an operation in which an operation input unit is continuously maintained in a predetermined state over a first threshold time period or greater, the operation input unit being used at least when switching between forward movement and rearward movement of the vehicle, wherein an operation with respect to the operation input unit is determined to be performed in a case where the operation on the operation input unit is performed over a second threshold time period, the first threshold time period being greater than the second threshold time period.

12. A computer readable non-transitory recording medium in which a program is stored for executing in a computer:

a step of displaying, on a display unit, a button configured to cause forward movement or rearward movement of a vehicle;

a step of determining whether or not the button has been continuously pressed by a user over a first threshold time period or greater; and a step of, after a target parking position has been selected from among at least one possible parking position in which the vehicle is capable of being parked, initiating movement of the vehicle into the target parking position on a basis of the button being continuously pressed by the user over the first threshold time period or greater wherein an operation with respect to the button is determined to be performed in a case where the button is pressed over a second threshold time period, the first threshold time period being greater than the second threshold time period.

* * * * *